Aug. 23, 1960    E. JONES ET AL    2,950,200
CONFECTION AND METHOD OF MAKING THE SAME
Filed July 7, 1958

INVENTORS.
EYNON JONES
OLIVER H. TRACY
BY
ATTORNEY

United States Patent Office 2,950,200
Patented Aug. 23, 1960

2,950,200

CONFECTION AND METHOD OF MAKING THE SAME

Eynon Jones, 2148 NE. 20th Ave., Portland, Oreg., and Oliver H. Tracy, Stamphere Road, Oswego, Oreg.

Filed July 7, 1958, Ser. No. 746,986

17 Claims. (Cl. 99—137)

This invention relates to confections, and has particular reference to a new form of ice cream bar.

Various types of ice cream bars and ice cream sandwiches have heretofore been made and sold with considerable success. Ice cream bars consisting of ice cream alone have been made with and without a supporting stick to facilitate handling and eating the bar. Ice cream sandwiches have been made consisting of a slice or block of ice cream sandwiched between two wafers. Also, various forms of edible containers have been proposed to support and at least partially enclose, and thereby provide means to grasp, a scoop or block of ice cream. In some cases, the container and ice cream block are intended to be sliced and served on a plate for eating with a fork but, in most cases, the ice cream and container are intended to be eaten from the hand as a sandwich. Such edible containers usually are made in the form of a cone, cup or tube.

In all cases, the eating of the prior products from the hand presents a problem, particularly for children. When the ice cream is solid and stiff, it is more resistant to biting than the supporting wafer element, with the result that the latter crumbles or breaks away from the ice cream, leaving the scoop or block of ice cream difficult to grasp in the hand. In warm weather, the block of ice cream tends to soften and melt faster than it can be eaten, causing it to drip and run down the stick handle or over the outside of the wafer support which is held in the hand. As the ice cream becomes soft, it offers less resistance to biting than the wafer portion, whereby, in biting the wafer, particularly in a sandwich arrangement, the ice cream is squeezed out in a semi-liquid condition. Also, in many cases, the partial eating of the wafer portion tends to free the remainder of the ice cream block, allowing it to fall out, in either hard or soft condition.

Conventional ice cream sandwiches tend to become damp and soggy if stored very long in a freezer. Hence this type of confection usually cannot be made complete by a manufacturer in quantity. In order to produce a palatable product the ice cream must be placed in the wafer portion by the seller at the time of sale which is an inefficient and costly operation.

It is, therefore, an object of the present invention to provide an improved form of confection which overcomes the objections and shortcomings of conventional products, as discussed above.

Another object is to provide an improved form of ice cream bar wherein the consumption of a portion of the bar will not tend to loosen or dislodge the ice cream from the remainder of the bar.

Another object is to provide a novel confection having an edible supporting member which will adequately support a filling material such as ice cream while the confection is being eaten from the hand.

Another object is to provide a confection having a filling material distributed in relatively small portions which can be eaten one portion at a time.

Another object is to provide a confection having a grid-like supporting structure retaining a filling in separate, bite-size chunks which may be eaten one at a time without disturbing the rest of the filling.

Another object is to provide an improved ice cream bar having a high quality, nutritious and tasty wafer portion.

Another object is to provide an ice cream sandwich-type of confection having a stick handle for convenience in eating.

Another object is to provide an ice cream sandwich-type of confection which may be manufactured economically in quantity and stored for a considerable period of time without the wafer portion becoming soggy.

The present confection comprises, in general, a waffle grid having open holes containing separate plugs of a filling material, such as ice cream. Each plug of filling material is individually interlocked in the grid structure so that it will not fall out unless it becomes soft enough to run. Preferably, each plug is not substantially larger than bite size whereby the plugs may be eaten successively one at a time without loosening the remaining plugs. The grid structure forms an insulating and sufficiently rigid support for the filling material which may be held with the fingers or by an embedded stick handle while the product is being eaten.

Various materials may be used for the grid structure and for the filling. A waffle mix makes a suitable grid structure for ice cream filling, for example, whereas for a cheese filling the grid structure may constitute a soda cracker, or the like. with numerous holes therein. Thus, the equivalent of a cracker and cheese hors d'oeuvre sandwich is obtained by a single cracker having holes filled with cheese by the manufacturer whereby no preparatory work is required by the user. In a similar manner an apertured cookie may contain small plugs of chocolate filling to produce a modified form of toll house cookie.

Still further objects and advantages will become apparent and the invention will be better understood from the following detailed description of the preferred embodiment illustrated on the accompanying drawing. Various changes may be made, however, in the shape of the supporting grid structure and in the composition of the grid and filling materials and all such modifications within the scope of the appended claims are included in the invention.

Figure 1:
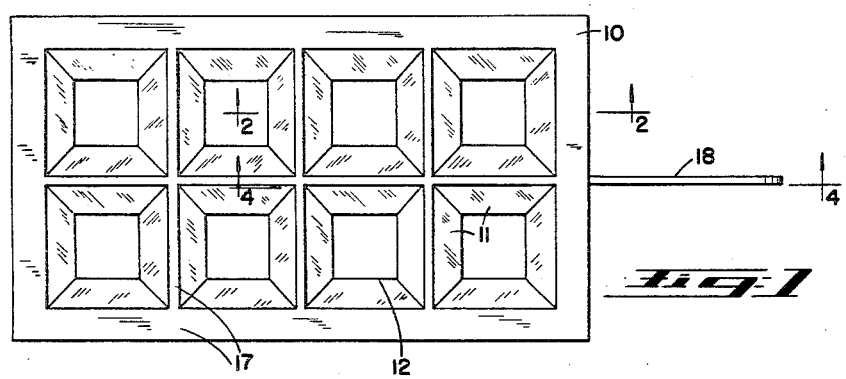
Figure 1 is a plan view of a special form of waffle which forms a supporting grid for the filler.
Figure 3:
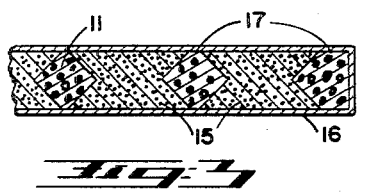
Figure 3 is a view similar to Figure 2 showing the filler in place.
Figure 2:
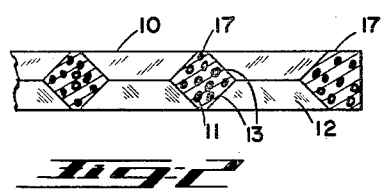
Figure 2 is a fragmentary cross sectional view taken on the line 2—2 of Figure 1.

The waffle grid 10 in the form illustrated in Figures 1 and 2 comprises a plurality of intersecting longitudinal and transverse bars or ribs 11 defining holes or openings 12 to receive the filler material. The grid surfaces 13 forming the margins of the holes slope inwardly from the top and bottom surfaces of the waffle to make the area of the hole the smallest in the medial plane of the grid base and the largest on the top and bottom surfaces of said base. Thus, when the holes 12 are filled with soft ice cream, or other suitable plastic filler, as shown in Figure 3, each plug of ice cream is molded by the surfaces 13 into an hourglass or rivet shape having a slender mid-section and broad end sections. When the ice cream is subsequently hardened by freezing, this shape provides a dovetail lock so that the plug of ice cream cannot fall out of the opening in either direction.

Preferably, when the filler is ice cream, the entire bar is dipped in chocolate or other suitable hardenable icing to form an enveloping coating 16 which will prevent dripping of the ice cream when it melts and will further assist in holding the plugs of ice cream in the holes if the ice cream should become softened. In the dipping process the coating material is adhered in part to the end surfaces of the plugs of ice cream and in part to the waffle grid surfaces 17 between and around the plugs of ice cream.

Figure 4:
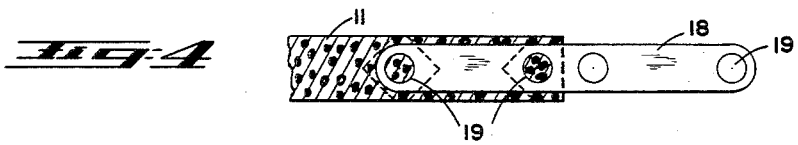
Figure 4 is a fragmentary sectional view taken on the line 4—4 of Figure 1.

The waffles are baked from a batter which will produce a light, porous structure containing enough shortening to prevent rapid absorption of moisture from the soft ice cream during the filling operation. The mating sections of the waffle iron may be slotted to hold a stick 18 which will serve as a convenient handle for eating the bar. The stick 18 is positioned on edge with one end projecting into the space which forms the central longitudinal bar or rib 11 of the waffle. The stick has four holes 19, two of which are positioned to align with two of the transverse bars or ribs of the waffle, as shown in Figure 4. When the waffle batter is poured into the waffle iron it flows through the holes 19 whereby, upon baking, the stick is integrally united with the waffle, the two transverse bars of the waffle being continuous through these holes so that there is no tendency for the waffle to break apart at the stick. The two holes in the projecting handle end of the stick are utilized for supporting the bar in rigid position on a conveyor device in the chocolate dipping machine. The holes are symmetrically arranged so that either end of the stick may be inserted in the waffle iron.

After baking, the waffles are frozen. Prior to filling the holes with ice cream, the frozen waffle may be dipped in a light solution of a suitable oil such as coconut oil to further moisture-proof the surface of the waffle without sealing up its natural coarse porosity which is utilized for ice cream retention.

Figure 5:
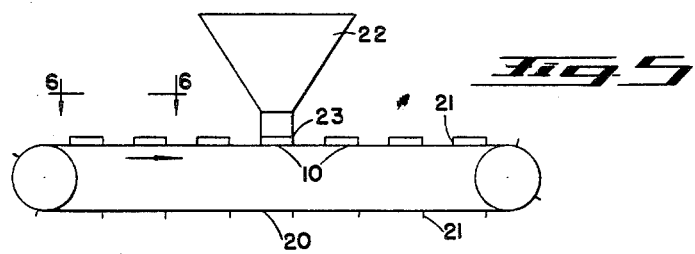
Figure 5 is a side elevation view of a simple apparatus for filling the holes in the grid.
Figure 6:
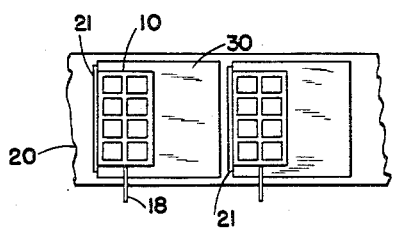
Figure 6 is a fragmentary plan view taken on the line 6—6 of Figure 5.

In the filling operation, the frozen waffles are placed on a conveyor belt 20, as shown in Figures 5 and 6, before they have time to assume room temperature. Conveyor lugs 21 pass the waffles beneath the distributing spout of a soft ice cream dispensing machine 22. The holes 12 are thus filled with ice cream which is soft enough to completely fill the holes with interlocking hourglass-shaped plugs. A flexible lip may be provided at 23 on the trailing side of the dispenser 22 to level off the top surface of the filling material flush with the top grid surfaces 17.

The ice cream dispensing spout may be equipped with nozzle openings spaced and arranged to correspond to the grid openings in the waffle so that each nozzle opening will deposit a measured quantity of ice cream in one of the waffle holes. In such an arrangement the conveyor moves in step by step movement bringing one waffle after another into register with the filling nozzles, a piston synchronized with the conveyor causing the waffle holes to be filled during dwell intervals while the conveyor is stationary. The filling machine 22 is conventional and need not be described in detail as such machines are commonly used for filling ice cream in paper cups and filling pie crusts with cream fillings and the like.

The waffles are placed transversely on the conveyor belt against the lugs 21 with a piece of waxed paper 30 under each waffle, as shown in Figure 6. When the filled waffles are removed from the conveyor the wax paper is folded over the tops of the waffles to keep them from sticking or freezing together in handling.

The waffles being at a cold temperature when the ice cream is introduced quickly congeal the layer of ice cream in contact therewith, stiffening the whole mass of each plug sufficiently that the plugs will not fall out of the holes when the waffle is removed from the conveyor. Since each plug of ice cream is relatively small and is surrounded laterally by the frozen waffle heat is quickly abstracted from the ice cream, lowering its temperature to the congelation point. In addition to the dovetail lock afforded by the hourglass shape of the ice cream plug, further retention is obtained by flow of the soft ice cream into small openings and voids in the porous texture of the waffle material itself. The ice cream flowing into such openings and voids is immediately congealed by the cold temperature of the waffle so that the latter is not rendered damp or soggy. The shortening content of the waffle batter and the oil coating prevent an undesired amount of absorption into the waffle material while the ice cream is congealing which would impair the texture and palatability of the waffle.

The waffles with their partially stiffened soft ice cream filling are then immediately returned to a freezer to cause the ice cream to harden and preserve the waffles in a fresh condition in a frozen state. After freezing and hardening of the ice cream the waffles may be packaged for distribution but, preferably, they are first given the chocolate coating 16. In either case, there is provided a new form of confection containing ice cream in bite size plugs which will not readily fall out of the supporting waffle base. Each ice cream plug is separate and apart from the others whereby eating one portion of the bar, or even breaking it apart, does not tend to dislodge the ice cream from other portions. The bar is conveniently held by its stick handle without touching the chocolate coating. The bars are made complete by the manufacturer and may be stored in a freezer for a considerable period of time without deteriorating as do conventional ice cream sandwiches.

It will be apparent that cheese crackers and other confections or hors d'oeuvres may be made in a similar manner. For example, the base member 10 may be a soda cracker having a plurality of openings containing interlocking plugs of cheese. The cheese may be inserted in a heated fluid condition and the plugs allowed to stiffen either at room temperature or by using refrigerated crackers to hasten the chilling. In using filling materials which are thus stiffened or congealed by cooling, the filling operation may be carried out in a refrigerated room where the filling material is kept flowable at some temperature above room temperature, if desired. In any case, regardless of how the necessary temperature difference is attained, the temperature of the waffle or cracker should be sufficiently below the temperature of the fluid or flowable filling material to congeal and stiffen the latter on contact.

As another example, a base member in the form of a cookie may be provided with tapered holes to receive hourglass plugs of chocolate or other icing material which will congeal and stiffen at ordinary room temperature. In such case, as with a cheese filling, although the filling material would stiffen and congeal at room temperature, it would do so much faster if the cookies were frozen or at least refrigerated or if the filling operation were carried out in a refrigerated room in which the supply of filling material were heated to maintain it in a fluid state.

In all cases, the plugs of filling material preferably assume the hourglass shape of rivets which are interlocked with the edible base member as long as the filling material remains in a semi-solid condition. When the rivet or hourglass shape is employed, penetration of the filling material into the porous texture of the cracker or cookie material is not necessary to prevent loss of the filling. Thus, the invention may be practiced with a base member having either a rough or smooth surface and with or without a porous texture. The stick handle may be omitted without sacrificing the principal advantages of the invention. The sectionalized or segmented construction of the base member facilitates division of the confection into separate smaller pieces when desired, the waffle grid bars readily breaking between the ice cream plugs without dislodging the later.

Having now described our invention and in what manner the same may be used, what we claim as new and desire to protect by Letters Patent is:

1. A confection comprising a base member having a plurality of holes therein, said holes being tapered from both sides of the base member to a minimum size in the mid-section of the holes, and separate hourglass-shaped plugs of filling material in said holes interlocked with said base member.

2. A confection comprising a generally flat base member having a plurality of holes therein in side by side relation, said base member being formed of a dough product and said holes tapering from both sides of said member to a minimum area at mid-section, and separate plugs of filling material of hourglass shape in said holes interlocked with said base member.

3. An ice cream bar comprising a waffle having a plurality of bite size holes therein, said holes tapering from both sides of the waffle to a minimum area at mid-section, and bite size plugs of ice cream in said holes of hourglass shape interlocked with said waffle.

4. An ice cream bar comprising a waffle having a plurality of holes therethrough, plugs of ice cream in said holes, each plug extending through the thickness of the waffle, and a chocolate coating adhered in part to the opposite ends of said plugs and in part to the surface of the waffle between said plugs.

5. An ice cream bar comprising a waffle having a plurality of holes therethrough, said holes tapering from both faces of the waffle to a minimum size at mid-section, separate plugs of ice cream of hourglass shape in said holes extending through the thickness of the waffle and interlocked with said waffle, and a coating adhered in part to the opposite ends of said plugs of ice cream and in part to said waffle between both faces of said plugs.

6. A sectionalized ice cream bar comprising a waffle having intersecting grid members defining bite size openings therebetween through the waffle, and bite size plugs of ice cream interlocked in said openings, said waffle being readily breakable through said grid members without dislodging said plugs of ice cream for dividing the bar into a plurality of pieces each containing a plug of ice cream.

7. A confection comprising a dough product base member having openings therethrough, plugs of filling material retained in said openings, said plugs of filling material being entirely separated and spaced from each other by portions of said base member of substantial width and thickness between said openings, and a stick handle embedded at one end in said base member in spaced-relation to said filling material, said handle having holes through which said base member is interlocked.

8. An ice cream bar comprising a waffle having straight longitudinal and transverse grid bars defining bite size openings through the waffle between said bars, a bite size plug of ice cream in each of said openings, and a stick handle having one end embedded in one of said grid bars of the waffle.

9. An ice cream bar as defined in claim 8, said handle having openings interlocked in said waffle.

10. An ice cream bar as defined in claim 9, said handle extending longitudinally within one of said grid bars and said handle openings being aligned with grid bars which are transverse to said one grid bar.

11. The method of making an ice cream bar comprising baking a waffle with a plurality of holes therethrough, each hole approximating bite size volume, freezing the baked waffle, supporting the frozen waffle on a horizontal surface, filling said holes with soft ice cream, immediately stiffening said soft ice cream in said holes by abstraction of heat from the ice cream to the frozen waffle, and then placing the waffle in a freezer to harden its ice cream filler.

12. An ice cream bar comprising a dough product base member having a plurality of holes therethrough, said holes being of different size in their mid-sections than at their ends for retention of a filling, and a separate plug of ice cream in each hole interlocked in said base member, portions of said base member extending between said holes and being readily breakable without dislodging said plugs of ice cream for dividing the bar into a plurality of pieces each containing a plug of ice cream.

13. An ice cream bar comprising a dough product base member having a plurality of holes therethrough, said holes having opposite end portions tapered in opposite directions for retention of a filling, and separate plugs of ice cream in said holes interlocked with said base member.

14. An ice cream bar as defined in claim 13, said holes being tapered inwardly from opposite sides of said base member to a minimum size in the mid-section of the holes, and said plugs of ice cream having hourglass shape.

15. An ice cream bar as defined in claim 13 including a stick handle having one end embedded in said base member in spaced relation to said plugs of ice cream.

16. An ice cream bar as defined in claim 13 including an edible coating adhered in part to the opposite ends of said plugs of ice cream and in part to surfaces of said base member between said plugs.

17. An ice cream bar comprising a dough product base member in grid form having a plurality of bite-size holes therethrough, said holes being tapered from opposite sides of said base member to a minimum area at mid-section, hourglass-shaped bite-size plugs of ice cream in said holes interlocked with said base member, a stick handle having one end embedded in said base member between said holes, and an edible coating covering said base member and plugs.

References Cited in the file of this patent

UNITED STATES PATENTS

| | | |
|---|---|---|
| 740,858 | Hosmer | Oct. 6, 1903 |
| 1,764,282 | Schnaier | June 17, 1930 |
| 1,942,423 | Henry | Jan. 9, 1934 |
| 1,950,734 | Leaf | Mar. 13, 1934 |
| 2,564,049 | Bevington | Aug. 14, 1951 |
| 2,759,826 | Lindsey | Aug. 21, 1956 |